Aug. 13, 1940. J. H. HOWARD 2,211,206
METHOD AND APPARATUS FOR COMPLETING A WELL
Filed March 13, 1937 7 Sheets-Sheet 1

Inventor
James H. Howard.

Aug. 13, 1940. J. H. HOWARD 2,211,206
METHOD AND APPARATUS FOR COMPLETING A WELL
Filed March 13, 1937 7 Sheets-Sheet 7

Inventor
James H. Howard.

Patented Aug. 13, 1940

2,211,206

UNITED STATES PATENT OFFICE 2,211,206

METHOD AND APPARATUS FOR COMPLETING A WELL

James H. Howard, Houston, Tex., assignor to J. H. McEvoy & Company, Houston, Tex., a corporation of Texas Application March 13, 1937, Serial No. 130,667

10 Claims. (Cl. 166—1)

This invention relates to a method of and apparatus for completing a well, including the running of screen and tubing into the well and setting the same under conditions of high pressures not compensated for.

In certain oil fields formations having extremely high gas pressures are frequently encountered. In such formations it is desirable to complete the drilling under the existing formation pressure, and it is possible by methods and apparatus heretofore known to do this, to remove the drilling equipment from the well under pressure, and to run into the well under pressure a string of tubing for production purposes. However, with such equipment it has not been possible heretofore to insert into such a well more than a very limited length of screen liner such as is ordinarily set in and below the lower end of the well casing. In many cases, however, it is desirable to insert into such a well a much greater length of screen and liner than has in the past been possible. All this must be done, of course, without releasing the pressure existing within the well, the same being controlled solely by the valves and other equipment at the top of the well.

It is an object of this invention to provide a method of and apparatus for inserting into a well a screen and liner of any desired length without releasing the pressure existing within the well.

It is a further object to provide means for running such screen or perforated pipe and the necessary tubing for production purposes into a well without at any time releasing the pressure existing therein and for setting said screen and liner, packing the same, and completing the well while still maintaining the well under control and without killing the natural formation pressure.

It is a further object of this invention to provide equipment by which the sand formation may be actually drilled or reamed with the screen assembly at the same time the well may be flowing under control.

It is a further object of this invention to provide equipment and a process whereby wells using screens and liners may be set or reconditioned without necessity of using conventional hydrostatic mud pressure to keep the well under control during such operations.

With the above and other objects in view, this invention consists of the various parts and combinations, together with the methods of operation set forth in the accompanying drawings and following description, it being distinctly understood, however, that the same are by way of illustration and example only, and are not to be taken as in any way limiting the scope of this invention. Such limitation is to be only by the prior art, and by the terms of the appended claims.

Referring now more particularly to the drawings in which like numerals indicate corresponding parts throughout.

Figure 1:
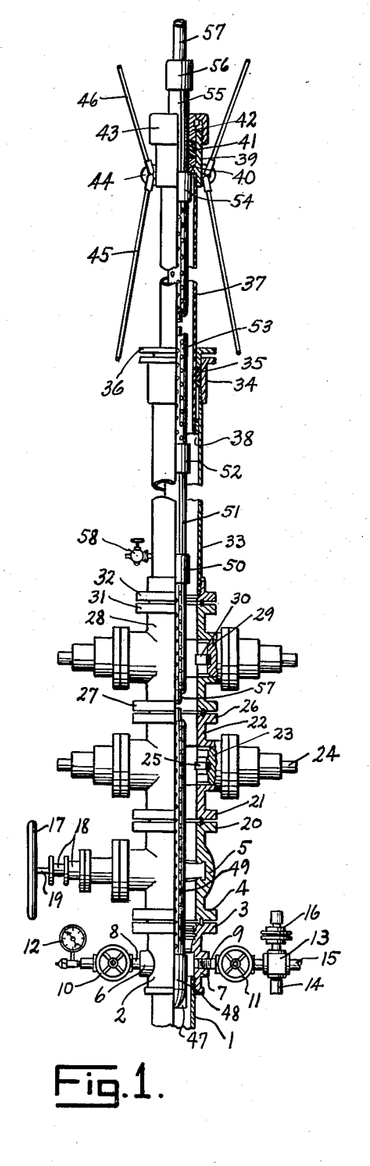
Fig. 1 is a view partly in vertical cross section illustrating the equipment and method for inserting screen and liner into a well under pressure.

Referring now to Fig. 1 in detail, this illustration shows the equipment at the top of the well after the drilling equipment has been removed from the well under pressure, and the setting shoe and screen have been started into the well.

In this figure, the numeral 1 illustrates the casing of the well on the upper end of which is mounted the casing head 2. To the flange 3 on the upper end of this casing head is secured the lower flange 4 of the gate valve 5. The casing head 2 is provided with lateral openings 6 and 7 to which are connected nipples 8 and 9, respectively, each of these nipples being controlled by a valve, those shown being indicated by the numerals 10 and 11. To one of these valves 10 may be connected a pressure gauge 12 for indicating the pressure within the casing, and to the other may be connected a fitting 13 in the form of a cross. The openings from this cross may be utilized in any desirable manner, some as illustrated at 14 being capped, others such as 15 being used for flowing purposes, and still others being provided with flanged fittings 16 and capped or otherwise utilized.

The gate valve 5 is operated by the customary hand wheel 17, suitable glands and packings 18 being provided to permit the passage of the valve stem 19 into the main valve body.

The upper flange 20 of the gate valve 5 is adapted to receive the lower flange 21 of a ram type blow-out preventer 22. This preventer, while preferably of the ram type, may be of any well known construction. In this instance, it is provided with rams 23 operated by suitable stems 24 and having packing rings 25 provided thereon. The rams 23 of this preventer are preferably of such size as to fit around the tubing which is to be later run into the well.

The upper flange 26 of the preventer 22 receives the lower flange 27 of a second blow-out preventer 28 of the same type. The rams 29 of this preventer, however, are of such size as to fit about the liner and screen to be run into the well, and are provided with packings 30.

To the upper flange 31 of the preventer 28 there is secured a flanged fitting 32 which threadedly receives the lower end of a length of pipe 33. The upper end of this length of pipe is provided with a second flanged fitting 34 forming a stuffing box to receive a packing 35 held in place by a gland 36. A section of tubing 37 of suitable size is passed through this packing 35, and is provided with a guide and stop ring 38 on its lower end so that it may slide up and down within the pipe 33.

At its upper end the tubing 37 is provided with a fitting 39 forming a second packing box adapted to receive a compression ring 40 and a packing 41, this packing being compressed by a gland 42 held in place by a suitable nut 43. It will be understood that the packing 41, the gland 42, and the compression ring 40 may be split so as to be the more readily removed from and be placed upon the tubing or liner as the case may be. The packing 41 is of such size as to fit snugly about a section of pipe of the diameter of the liner and the screen.

The fitting 39 is provided with laterally extending ears 44 on its outer surface, these ears being adapted to receive the snub lines 45 and lift lines 46, the function of the same being as hereinafter set forth.

As illustrated in this figure, a set shoe consisting of lower and upper portions 47 and 48, respectively, is secured to the lower end of the lower section of screen 49. To the upper end of this section of screen is coupled by means of a collar 50, a short section of blank pipe 51. On the upper end of this section 51 there is a second collar 52 to which a second section of screen 53 may be connected. In like manner, a collar 54, a second section of blank pipe 55, and a collar 56 may be secured to the upper end of the section of screen 53. It will be appreciated that any number of sections of screen may be joined together in this fashion, depending upon the length of screen desired to be set in the well.

Figure 7:
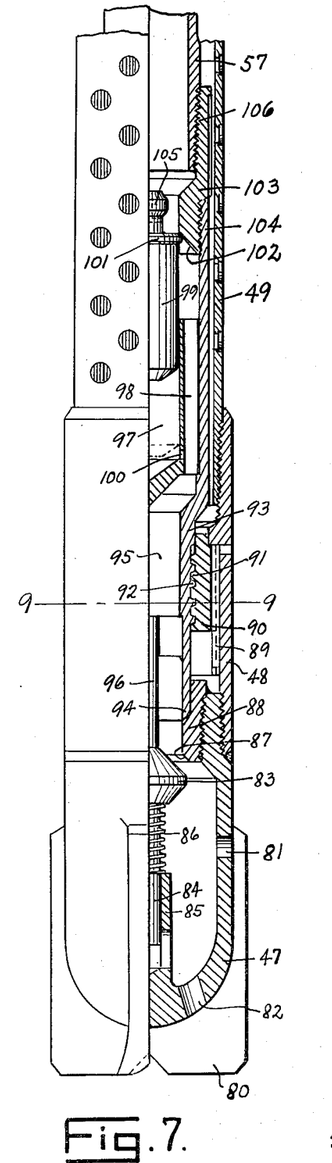
Fig. 7 is a view partly in vertical cross section illustrating the details of construction of the shoe at the lower end of the liner.
Figures 8, 9, 10:
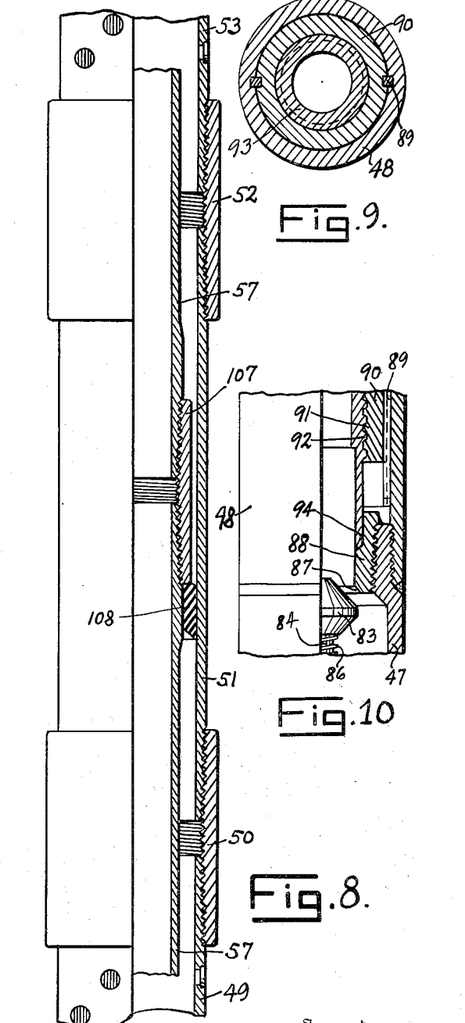
Fig. 8 is a view partly in vertical cross section illustrating the details of the joints between the successive sections of screen as they are run into the well under pressure.
Fig. 9 is a horizontal cross section taken along the line 9—9 of Fig. 7.
Fig. 10 is a view showing a slightly modified form of the valve illustrated in the shoe of Fig. 7.

Extending upwardly through the sections of screen is a tubing 57, the purpose and manner of connecting the same being illustrated in detail in Figs. 7 and 8. A small stopcock or valve 58 is employed for the purpose of relieving pressure within the pipe 33, as will be hereinafter explained.

Figure 3:
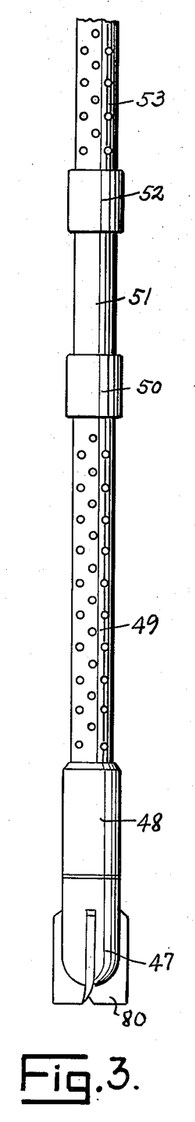
Fig. 3 illustrates the lower end of the string of screen, together with the shoe which is employed on the lower end thereof.
Figure 4:
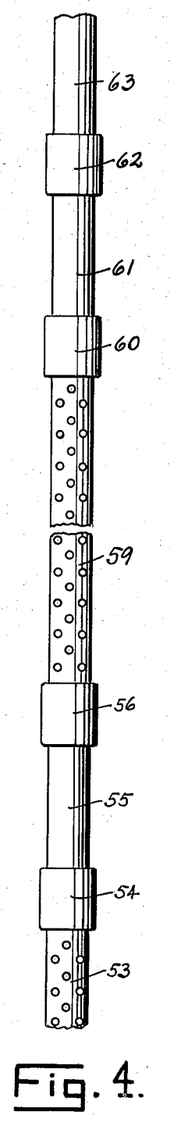
Fig. 4 is a view similar to Fig. 3, but illustrating further the make-up of the screen to be run under pressure.

The structure and manner of connecting the sections of screen together is illustrated more in detail in Figs. 3 and 4. In Fig. 4 an additional section of screen 59 is shown secured to the collar 56, and a collar 60, a short section of blank pipe 61, and a collar 62 are mounted on the upper end of the screen section 59. The liner 63 is connected to the collar 62 and is built up in a manner similar to that described in connection with the screen. As illustrated, this liner consists of the section 63, the collar 65, the short section of tubing 66, the second collar 67, a second section of liner 68, and a collar 69. The member 70 which is secured to the collar 69 carries a shoulder 71, and a section 72 slidable with respect to the section 70 is mounted above the shoulder 71. Between the section 72 and the shoulder 71 is positioned the customary canvas or rubber packer 73 which may be of any suitable well known form. A setting tool for this packer is provided on the tubing 57 at 74, and its operation will be described in a later paragraph.

Figure 6:
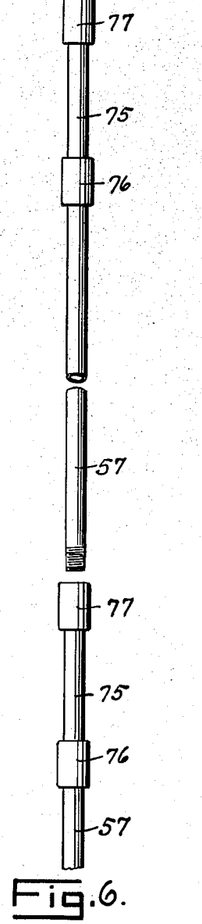
Fig. 6 is a view illustrating the method of making up the tubing for running the same into the well under pressure according to this invention.

The tubing which has been referred to is made up of sections 57 joined together by short sections of tubing 75 which are coupled to the sections 57 by couplings 76 and 77, respectively.

Referring to Fig. 7, the setting shoe is illustrated, the lower section 47 of the same being provided with fins or blades 80 which are customarily provided on setting shoes. This section is likewise formed with openings 81 and 82 for the purpose of permitting washing fluid to be forced therethrough. Within the section 47 is a valve 83 carried by a valve stem 84 which in turn is guided by a guiding sleeve 85. The valve 83 is normally urged by the spring 86 toward seating engagement with a valve seat 87 formed in the lower end of a ring 88. The ring 88 is threadedly carried by the upper end of the section 47.

Within the upper section 48 of the setting shoe there is provided a key way adapted to receive a key 89 providing a sliding but non-rotatable engagement with a nut 90 mounted therein. This nut 90 is provided with coarse pitch Acme threads 91 adapted to receive the similarly formed threads 92 on the lower end of the fitting 93. The lower end of this fitting seats at 94 in a seat provided therefor in the upper portion of the ring 88. A bridge 95 is provided within the fitting 93 for the purpose of contacting the stem 96 on the upper end of the valve 83 to hold the valve 83 in open position while the fitting 93 is in place to prevent erosion while drilling with the set shoe section.

Within its upper portion the fitting 93 is provided with a cup 97 suspended therein, a space 98 being provided around this cup for the circulation of fluid. The cup 97 is of a size to slidingly receive the plug 99, an opening 100 being provided in a lateral wall of the cup to permit the plug to move downwardly into the cup.

Normally, the plug 99 is held in its uppermost position with the portion 101 thereof seated against a seat 102 formed on the lower end of a connection 103. The natural pressure of the well will ordinarily hold this plug in its upper position. The ring 103 is threaded at 104 into the upper end of the fitting 93 so as to form a continuation thereof. The upper end of the plug 99 is provided with a connection 105 for an overshot. The ring 103 is internally threaded at its upper end to receive the lower end of the lower section of tubing 57.

In Fig. 8 will be seen the manner of connecting the sections of tubing within the screen while the same is being run. The sections of tubing 57 are simply connected by collars 107 in the customary manner, but the sections 57 are formed of such length and are so positioned that the joints provided by the collars 107 will fall between the ends of adjacent sections of screen and within the short sections of blank pipe such as 51. In order to prevent the pressure from the well from passing into the interior of the lower section of screen and up along the tubing to the next section of screen and out again, the upper end of each section of tubing 57 is surrounded adjacent the collar 107 with a packing ring 108 which packs off the space between the tubing section 57 and the short sections of tubing interposed between the screen sections such as illustrated at 51, it being also understood that in some wells the tubing collars can fit close to the inside of the blank pipe 51 and form a substantial seal.

Figure 5:
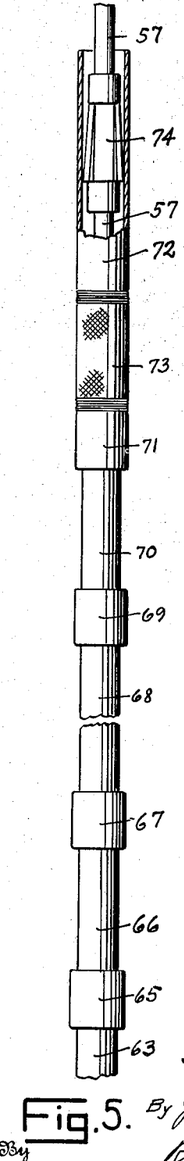
Fig. 5 illustrates a portion of the liner and the packing apparatus by which the liner and screen are packed off in the lower end of the casing.

After the drilling equipment has been removed from the well, the valve 5 is closed and the arrangement illustrated in Fig. 1 is mounted thereon. In so mounting this arrangement, however, the setting shoe is first secured to the lower end of the lower section of screen and the tubing secured to the inside thereof as previously described. This setting shoe is then suspended within the apparatus above the gate valve 5 and below the stuffing box carrying the packing 35. If only one section of screen is desired, the blow-out preventer 28 may then be closed upon the short section of blank pipe 51 at the upper end of this first section, the liner and tubing secured thereto, the gate valve opened, and the running thereof carried out as hereinafter described. Where a number of sections of screen are desired, however, the second section is mounted above the first section, as shown in Fig. 1, and the packing 41 is placed about this second section at the upper end of the tube 37. The valve 5 may now be opened and the telescoping tubing section 37 snubbed downwardly by means of the lines 45 until the short section of tubing 51 is opposite the rams of the blow-out preventer 28. These rams are then closed, the pressure is bled from the pipe section 33 by means of the valve 58, the packing 41 is removed, another section of screen and another short section of blank pipe are secured to the upper end of the section 55, and the packing 41 again placed in position about the upper short section of blank pipe. It will be understood that at the same time another section of the tubing 57 will be added. After the packing 41 has thus been placed in position, the blow-out preventer 28 may again be opened and the next section of screen snubbed into the well by the lines 45, the rams being closed about the next succeeding short section of blank pipe. It will readily be seen that this process may be carried on indefinitely until any desired length of screen has been run into the well. When the last section of screen has been secured, and it is desired to attach the liner, this is done as illustrated in Figs. 4 and 5. A packing similar to that illustrated in Fig. 8 is placed about the tubing above the last section of screen, and no further such packings need be employed. In the manner just described for running the screen, any desired length of liner may be run, the packing being mounted on the last section of liner as illustrated in Fig. 5.

With the blow-out preventer 28 closed about the last short section of blank liner, such as 68 in Fig. 5, a packing of smaller diameter is provided of a size adapted to fit around the tubing 57. The first section of tubing above the liner is then added and the new packer placed thereabout. The blow-out preventer 28 is then opened and the tubing is run in until the upper section of the liner is below the blow-out preventer 22. This blow-out preventer is then closed about the tubing, and the blow-out preventer 28 and the equipment thereobove is removed. During this operation the well is held under control by the blow-out preventer 22 sealing the space between the casing and the tubing, and by the plug 99 sealing the lower end of the tubing. There is then placed in position on the well above the blow-out preventer 22 the equipment illustrated in Fig. 11 consisting of the blow-out preventer 109 and the short section of pipe 110 carrying at its upper end the block 111 with hold-down slips 112 adjustable by means of a hand wheel 113.

Figure 11:
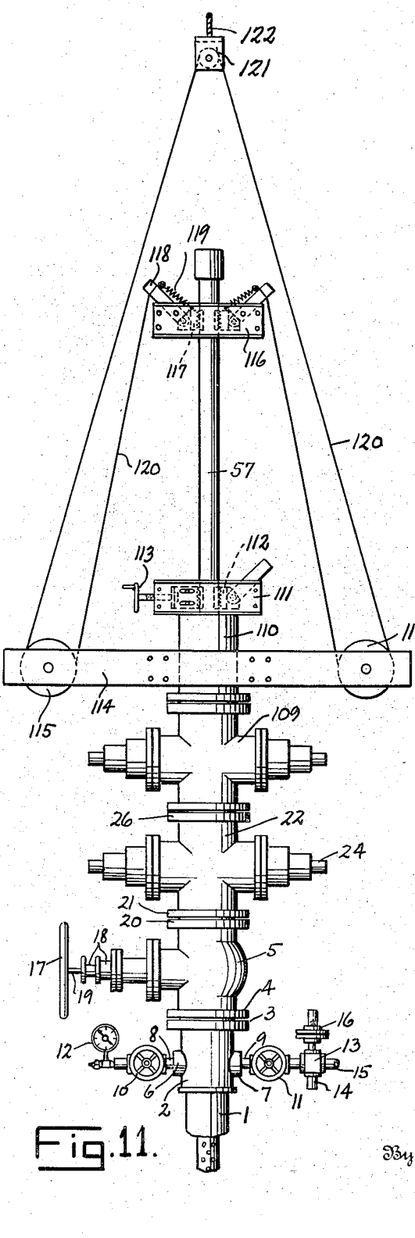
Fig. 11 is a view illustrating the means and method of running the tubing into the well under pressure after the screen has passed the upper end of the well.

Clamped around the pipe section 110 below the block 111 is a cross arm 114 carrying at its opposite ends pulleys 115. The tubing section 57 which projects through the slips 112 is moved downwardly by a block 116 carrying snubbing slips 117. These slips are carried and operated by levers 118 having springs 119 normally urging them out of engagement with the pipe. Secured to these levers are the opposite ends of the snubbing line 120, this line passing from the respective levers downwardly and around the pulleys 115, and upwardly therefrom and over the pulley carried by the block 121 and the cable 122. Thus it will be seen an upward movement of the cable 122 will serve to move downwardly the block 116 and the slip 117 thus slipping the tubing 57 downwardly through the slips 112 and the blow-out preventers 109 and 22. When a collar forming a joint between the tubing sections has been moved downwardly to a position just above the rams of the preventer 22, the preventer 109 is closed and the preventer 22 is opened to permit this collar to move on downwardly.

The tubing may then be run into the well until the setting shoe has approached the bottom of the well in a manner readily apparent.

Figure 2:
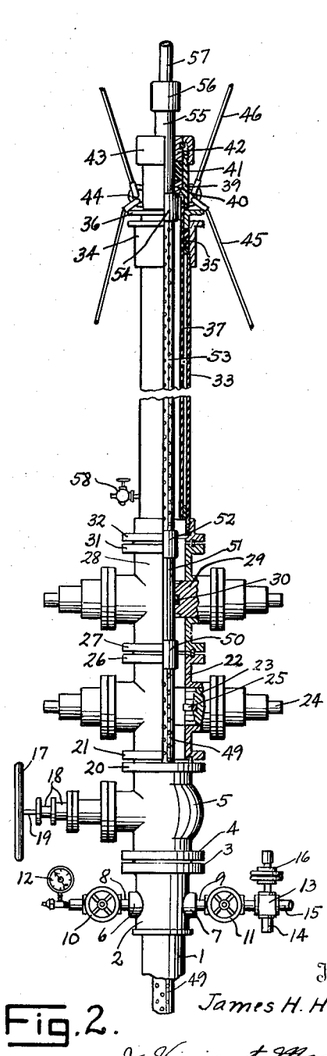
Fig. 2 is a view similar to Fig. 1 showing the same equipment in a different position.
Figure 12:
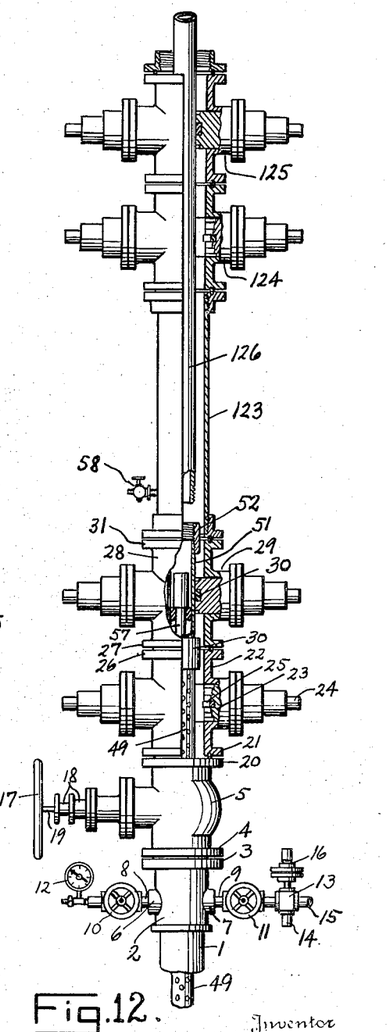
Fig. 12 is a view illustrating a modified form of equipment for the upper end of the well for running the screen, liner and tubing into the well under pressure.

In Fig. 12 is illustrated an optional form of structure for running the screen and tubing under pressure. In this form, the telescoping joint shown in Figs. 1 and 2 is eliminated, and in its place there is provided a lubricator joint 123 mounted on top of the pair of blow-out preventers illustrated in Fig. 1, a blow-out preventer 124 being mounted on top of the lubricator, and another blow-out preventer 125 mounted on top of the preventer 124. When screen is being run, it is made up in the same form as previously described, the shoe being lowered below the lower preventers, while the gate valve 5 is still closed. The first section of screen is secured to the shoe when it is lowered, and the first short section of tubing between the first section of screen and the second section is also in place. A handling nipple 126 is then screwed into this short section of tubing. The blow-out preventer 125 is now closed about the handling nipple 126 above the short section of tubing, and the gate valve 5 is opened. The handling nipple which now suspends the first section of screen and the shoe, is forced downwardly through the blow-out preventer 125 until the short section of blank pipe is positioned within the blow-out preventer 28. The blow-out preventer 28 is then closed, the preventer 125 is opened, and the handling nipple is withdrawn. A section of tubing such as passes through the screen is then inserted into the joint which is within the short connecting section of blank pipe and is screwed into place, and the second section of screen is screwed into place. Another short section of blank pipe is then connected to the upper end of the second section of screen and the handling nipple attached thereto as in the previous instance. The upper preventer 125 may then be closed again about the handling nipple 126 and the lower preventer 28 may be opened, at which time the screen and handling nipple may again be slid down through the preventer 125 and the process repeated until any desired length of screen has been run into the well. When the last section of screen and liner has been run into the well, the handling nipple is then dispensed with and instead the section of tubing which is next to be run in is put in place, and the preventer 124 is closed thereabout. The preventer 28 can then be opened from its clamped position around the liner, and the tubing slid downward through the preventer 124. When the coupling of the first joint of tubing has passed below the preventer 22, this preventer may then be closed, and the preventer 124 opened. It will be understood that the blow-out preventers 22 and 124 are provided with rams of such a size as to fit about the tubing to be run in, while the preventers 28 and 125 are provided with rams adapted to fit about the liner and the sections of blank pipe between the sections of screen. After the first section of tubing above the liner has been run in and the preventer 22 closed thereabout as above described, all of the equipment above this preventer may then be removed and replaced with the blow-out preventer 109 and the other equipment shown in Fig. 11. The running of the tubing is then continued as described in connection with Fig. 11.

Figure 13:
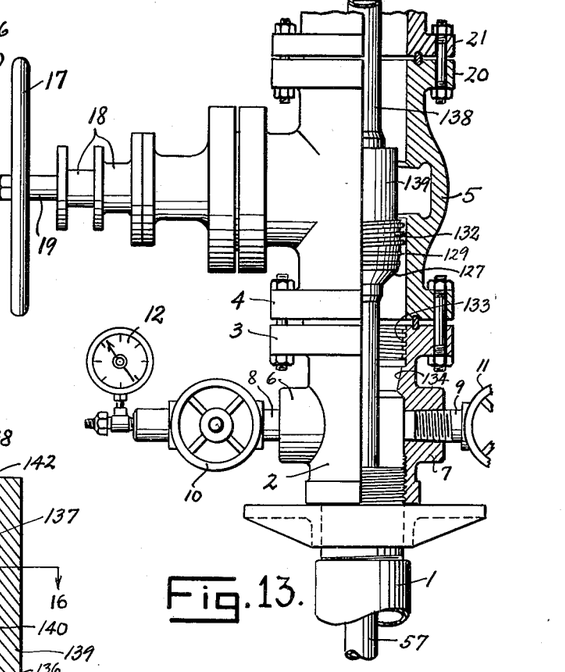
Fig. 13 is a view illustrating one form of hanger for the tubing being lowered into position within the casing head.
Figure 14:
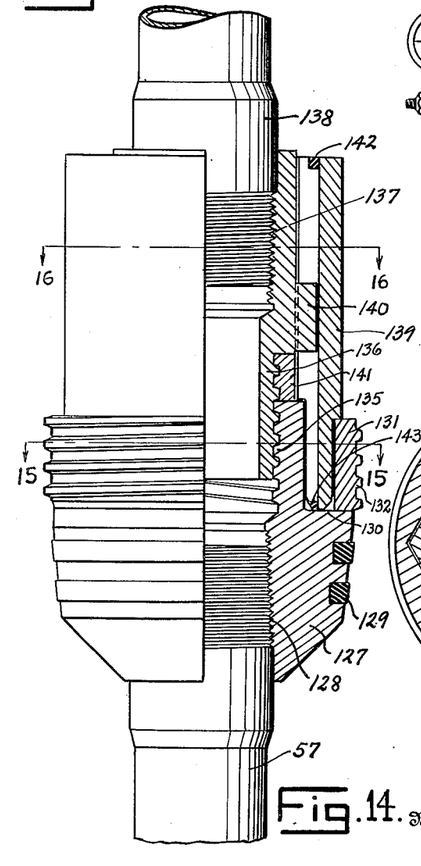
Fig. 14 is an enlarged view illustrating the hanger of Fig. 13, and the means whereby it is locked in position within the casing head.

For the purpose of hanging the tubing after it has been run into the well, and it is desired to hang the upper end of the tubing and prepare the well for production, there is provided a combined hanger and packer 127, having a threaded internal portion 128 adapted to threadedly receive the upper end of the tubing. This hanger has an outer frusto conical surface about which are positioned packing rings 129, and is provided adjacent its upper end with a shoulder 130 against which a nut 131 is adapted to bear to hold the hanger in position within the casing head. The nut 131 is provided with external right hand threads 132 of the well known Acme type. These threads are of a size to cooperate with the threads 133 formed in the interior of the upper part of the casing head 2, and when the hanger is thus secured in position the rings 129 will cooperate with the frusto conical seat 134 in the casing head to support the hanger therein and to form a fluid seal therewith.

In the upper part of the hanger 127 there are formed left hand internal Acme threads 135 for the purpose of receiving the external Acme threads 136 provided on the handling tool. This tool is carried by the lower end 137 of a handling nipple 138, and consists of the portion 136 already referred to and a wrench portion 139. The portion 136 is provided with a laterally extending lug 140 which is slidably mounted within a groove formed in the inner wall of the wrench 139. In landing the tubing hanger, an additional auxiliary ring 141 is provided, said ring being internally threaded to be screwed onto the handling tool 136 above the upper end of the hanger 127. A stop 142 is provided at the upper end of the slot in the wrench 139, and a second stop 143 at the lower end thereof for the purpose of retaining the wrench in position and preventing it from sliding off of the handling tool 136.

When it is desired to land the tubing, the joint where the tubing is to be landed is drawn up above the lower of the blow-out preventers which will fit it, and said preventer is then closed. The upper of the preventers may then be opened and the handling nipple which has theretofore been used in manipulating the tubing can be removed. The hanger 127 is then screwed into place on the upper end of the tubing, and the handling nipple and the handling tool are connected to the hanger as illustrated in Fig. 14. After this is done, the upper preventer is again closed about the handling nipple and the lower preventer opened, whereupon the hanger and tubing are lowered upon the handling nipple until the hanger seats within the casing head and forms a seal with the walls 134 of the casing head. Rotation of the handling nipple to the right will then cause the ring or nut 131 to be screwed down, thus securing the hanger 127 in place. At this same time, however, the handling tool will be unscrewed from the interior of the hanger because of the fact that the threads 135 are left hand threads. Due to the fact that the ring 141 is used, the handling tool will be disengaged from the hanger prior to the time that the ring 131 is screwed in tight. Thus upon tightening of the ring 131 the handling tool and handling nipple may be removed.

It is noted that the handling tool is so designed that the hanger may be removed as well as put in position thereby. When it is desired to remove the hanger, the handling nipple and tool are lowered without the ring 141, and are rotated to the left. The wrench 139 will naturally drop down into the socket within the ring 131 and will serve to unscrew this ring from its position within the head. At the same time, the handling tool 136 will be screwed into the upper end of the hanger. Due to the absence of the ring 141, the ring 131 will be disengaged from its threads within the head prior to the time that the handling tool 136 is fully screwed down into the hanger 127. When it has thus been screwed down, the ring 131 is already released, and the hanger may be readily withdrawn from its seat within the casing head.

Figures 17, 18, 19:
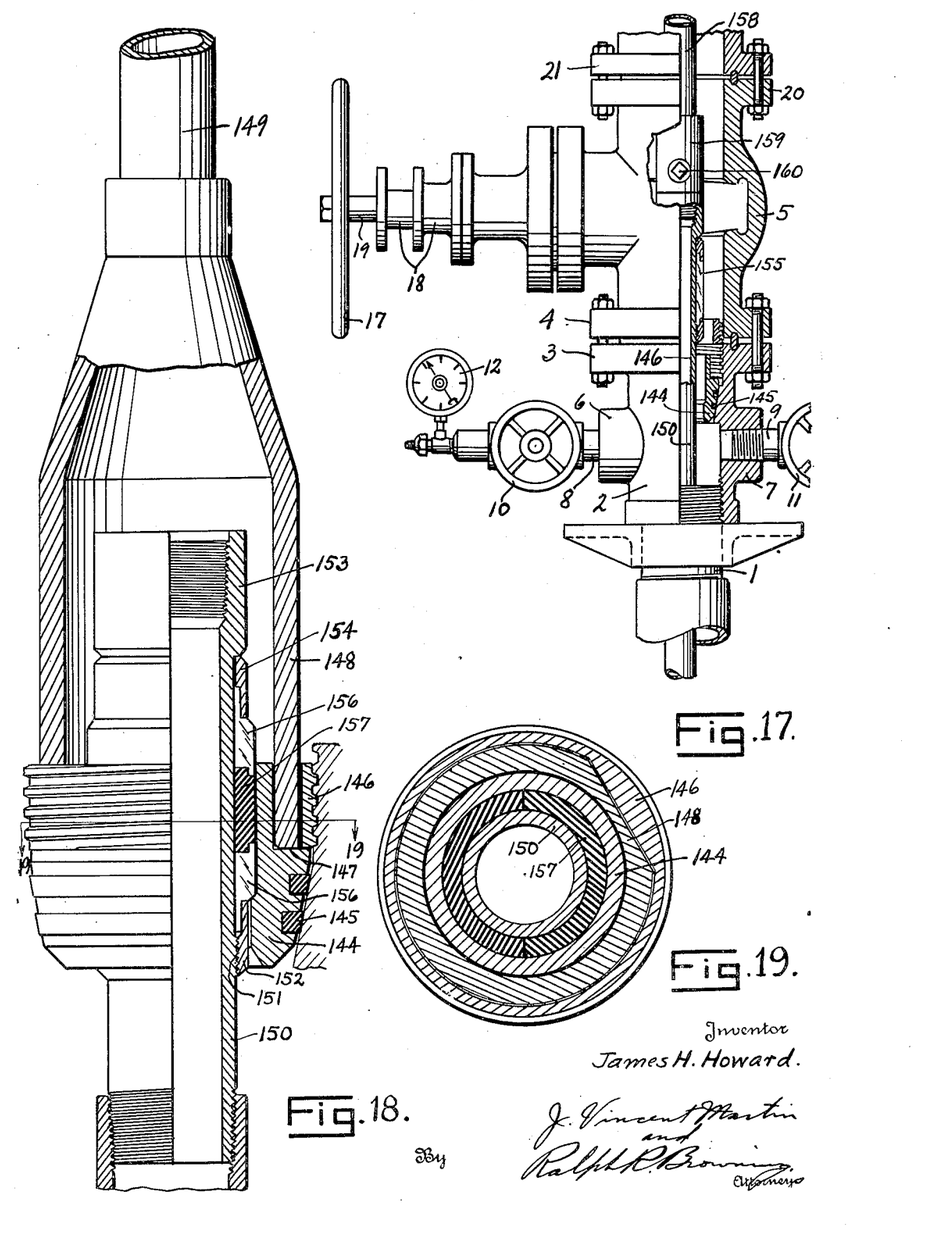
Fig. 17 is a view similar to Fig. 13 but illustrating a different form of hanger for the tubing.
Fig. 18 is a view partly in vertical cross section illustrating the hanger of Fig. 17 as it is being locked into position.
Fig. 19 is a horizontal cross section taken along the line 19—19 of Fig. 18.

In Figs. 17, 18 and 19 a somewhat different form of hanger is illustrated. This hanger 144 is provided with packing rings 145 which may be identical with those shown in Fig. 14, and with a ring 146 which may be identical with the ring 131 of Fig. 14. This ring 146 bears against a shoulder 147 in substantially the same manner as previously described.

Figure 15:
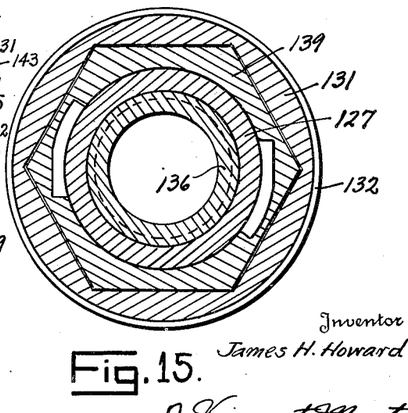
Fig. 15 is a horizontal cross section taken along the line 15—15 of Fig. 14.
Figure 16:
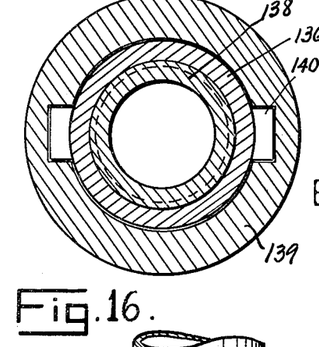
Fig. 16 is a horizontal cross section taken along the line 16—16 of Fig. 14.

The hanger of Figs. 17, 18 and 19 differs from that illustrated in Figs. 13, 14 and 15 in that it is not internally threaded either for the purpose of securing it to the tubing, or for the purpose of receiving a handling tool. In securing this hanger in place, the only tool employed is a wrench which may be of the form illustrated in Fig. 18 at 148, this wrench being carried by a nipple 149.

In utilizing this form of hanger, a special section of tubing 150 is employed at the upper end of the tubing string. This section is provided with an externally upset portion having threads 151 adapted to receive the ring 152. At its upper end, it is provided with an enlarged collar 153 against which rests a ring 154. The hanger 144 may be inserted into the head at any time during the running of the tubing, or after the tubing has been run, and is simply allowed to rest within its seat in the casing head surrounding the tubing. Between the rings 152 and 154 there may be provided a split filler ring 155 which is of such a diameter that it will pass through the hanger 144 as will also the rings 152 and 154. The tubing may then be manipulated as desired under pressure while setting the packer 73 and positioning the tubing until it is desired to hang the same, when it is drawn up above the blow-out preventers and the equipment illustrated in Fig. 18 is placed thereon. This equipment consists of upper and lower split rings 156 between which is placed a split packing 157. It will be noted that these rings and packing are held in place by the rings 152 and 154, it being understood, of course, that the filler ring 155 is removed before this equipment is put in place. When the tubing is lowered with this equipment in place, the shoulder at the lower end of the lower ring 156 will come in contact with a seat provided therefor in the lower portion of the hanger 144. This will cause the split ring 156 to move upwardly compressing the packer 157 against the upper split ring 156 and providing a seal between the upper end of the tubing and the interior of the casing head. The weight of the tubing will at all times augment this seal. After the tubing has thus been landed within the hanger 144, the handling section or nipple may then be removed and the wrench 148 inserted for the purpose of screwing the ring 146 in place and locking the tubing hanger in its seat.

In finishing a well with the equipment which has been described, the screen and tubing will first be run in as hereinbefore described. After the set shoe has reached the bottom of the well, if the bottom of the well is clean and does not require any further drilling in or washing, the tubing is rotated to the right for the purpose of disengaging the threads 92 (Fig. 7) from the threads 91, thereby releasing the tubing from the set shoe. The tubing is then raised permitting the valve 83 to close against its seat 87, and the packing between the liner and the casing is set in the ordinary manner. That is, the tubing is raised until the setting tool 74 engages the upper end of the liner, and the tubing is then lowered and by its weight causes the expansion of the packer 73. During this operation, pressure is excluded from the tubing by means of the plug valve 99 shown in Fig. 7. The hanging of the tubing may be carried out under full pressure control as above set forth with either of the hangers described.

Figures 20, 21:
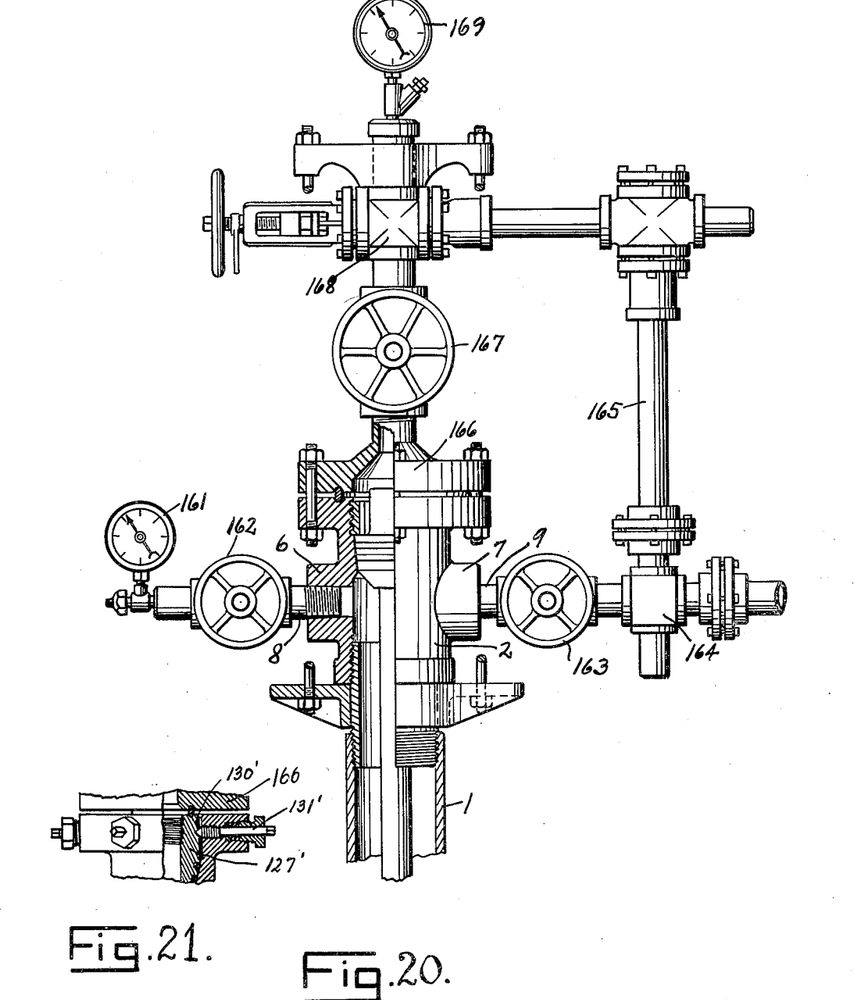
Fig. 20 is a view partly in vertical cross section illustrating the upper end of the well after the same has been completed.
Fig. 21 is a fragmentary cross section showing a slightly modified means for securing the hanger in the head.

After the tubing has been hung, the pressure of the well is under control because of the fact that the hanger serves to seal the space between the tubing and the casing while the passage through the tubing is sealed by the plug valve at the lower end thereof. Thus, after the tubing has been hung, it is permissible to remove the gate valve 5 and all the equipment above this gate valve without releasing the pressure within the well. The so-called "Christmas tree" may then be built up as illustrated in Fig. 20, a gauge 161 being connected to one of the flow lines of the casing head through a valve 162, and the other flow line being connected through a valve 163 to a cross 164. Any suitable connections with this cross may be provided, among which it is desirable to employ a bypass nipple 165 by which pressure from the casing may be bypassed into the tubing and vice versa. To the upper end of the casing head there is connected a flange fitting 166 and a valve 167 leading to the customary choke 168. A gauge 169 may if desired be provided for indicating the tubing pressure.

When these connections have been completed, the well pressure will exist within the space between the tubing and the casing, and upon opening the valve 162 this pressure will be registered on the valve 161. Upon opening the valves 163 and 167, the pressure from this space within the casing may be bypassed through the nipple 165 and choke 168 into the tubing, thus equalizing the pressure inside and outside the tubing. In most cases, this will be sufficient to cause the dropping of the plug 99 and will thus open the tubing to the pressure within the well. The valves employed in the Christmas tree may then be manipulated to control the production in the ordinary manner. If the pressure obtained by bypassing from the casing as just described is insufficient to cause the dropping of the plug 99, additional pressure may be supplied by a pump or the like to bring about this result. When upon lowering the screen and tubing into the well obstructions are encountered which make it necessary to wash down through the tubing and through the shoe, this may be accomplished by simply connecting a pump to the upper end of the tubing and pumping downwardly. In this instance, however, where the form of shoe illustrated in Fig. 7 is used, it will be necessary to employ a valve of some description adjacent the upper end of the tubing such as is illustrated for instance in Fig. 17. In this figure the handling nipple 158 is connected to the fitting 159 in which the valve, in this instance a plug valve, is located. As soon as downward flow starts through the tubing, the plug 99 will be forced downwardly away from its seat 102 and the fluid will be allowed to pass outwardly past the valve 83 and through the openings 81. While the threads 91 and 92 are ordinarily left hand threads so that rotation to the right will disengage the tubing from the shoe, if it is found necessary or desirable for the purpose of drilling out debris or reaming the sand section with the blades 80 on the shoe, these threads may be made right hand threads so that rotation of the tubing will cause rotation of the shoe and permit drilling out, in which case it would be necessary to release the tubing from the set shoe prior to setting the packer by left hand rotation. Since regular tubing joints are fine pitch tapered threads which have been tightened, and the connection to the set shoe is coarse pitch straight Acme threads, the Acme thread at the set shoe will unscrew first as has been found the case in field practice.

In either instance, after the drilling out or washing has been completed, the handling nipple 158 is drawn up, the packer is set in the manner previously described, and the valve 160 is closed. Thereupon, the packer which surrounds the tubing within the hanger is put in place and the tubing is hung, after which the handling nipple 158 may be removed. The gate valve 5 and equipment thereabove may then be taken off as before, and the Christmas tree put in place. This time, however, a stuffing box will be arranged at the upper end of the Christmas tree in the place of the gauge 169, and a tool will be inserted through this stuffing box for the purpose of removing the fitting 159 carrying the valve 60 and drawing this fitting up above the valve 167. The valve 167 may then be closed and the fitting 159 and valve 160, together with the tool just referred to, may be removed. The gauge 169 may then be replaced, and the well is ready for production either through the tubing or the casing, or both.

Referring particularly to Fig. 10, there is illustrated here a slight modification of the set shoe of Fig. 7 in which the valve 83 is not provided with the stem 96, but is permitted at all times to move against its seat. The purpose of the stem 96 in Fig. 7 is to hold this valve open during washing or drilling operations so that the valve will not be cut out by the wash passing therethrough. However, if it is desired to use this valve as a check valve, as it may be where usually high bottom hole pressures are encountered, the stem may be omitted as shown in Fig. 10 so that the valve will serve constantly to prevent the passage of the bottom hole pressure into the tubing.

It will be appreciated by the foregoing that there is provided apparatus and a method whereby any desired length of screen and such tubing as may be necessary may be run into a well which has been drilled in under pressure without at any time relieving or losing control of the pressure within the well. It will be appreciated further that the well may be finished so as to permit flow through either the tubing or the casing, or both, and that any desired Christmas tree connections may be made while the well is at all times maintained under absolute control.

In addition to the foregoing, it is possible with the apparatus and method set forth to remove all equipment used in running the screen and tubing from the top of the well after the screen and tubing have been run, leaving on the well only the casing head which supports the tubing hanger. The only other equipment used on top of the well after the well has been completed is the Christmas tree equipment. It will be appreciated that this makes possible the salvaging of considerable amount of very expensive equipment which under most circumstances is necessary to leave on the well.

It is also intended that the reversal of this process may be performed for the purpose of removing the screen, liner and set shoe from the well should the screen sand cut and require replacing. Also, should it be necessary to raise, lower, or remove and rerun the tubing for any purpose during the production life of the well it may be done with this equipment.

In the rotary system, when formation pressure drops off, it has been found desirable to use oil, or a mixture of oil and gas to drill in with, or replace screens, or rework the well in any manner, rather than use the conventional mud mixture due to the heavy hydrostatic pressure of the mud column which forces the mud into the oil sand and sealing it with mud cutting down the productivity of the sand. This equipment permits the elimination of drilling fluids which give a higher hydrostatic pressure at the bottom of the well than the existing formation pressure, in other words, the well may actually be flowing while performing the foregoing described operations.

It is to be understood that the term "blow out preventer" as used in the appended claims, is intended to include all devices capable of forming a sliding seal between the casing and tubing which may be opened or closed at will.

In Fig. 21 there is shown a slight modification in which the hanger 127' is secured in place in the head by means of set screws 131' threaded through the upper part of the bowl of the head and engaging with seats 130' formed in the hanger for that purpose. It will be seen that the method employed in using this form will be substantially the same as that previously described except that the hanger may be lowered into position with an ordinary length of pipe, and is secured in place by simply tightening the set screws.

From the foregoing it will be seen that means and method have been set forth which are fully capable of accomplishing all the objects sought by this invention.

Having described my invention, I claim:

1. In a method of running screen into a well having casing therein closed adjacent its upper end and containing high formation pressure not compensated for, the steps of making up the screen with closed imperforate sections interposed therein at intervals, forming a slidable seal between an imperforate section and the casing above the point of said closure, opening the casing, sliding said slidable seal and the screen connected thereto downwardly, forming a second seal between an imperforate section and the casing at a point below the slidable seal, removing the slidable seal from the imperforate section to which it was secured, forming a slidable seal between the casing and a higher imperforate section, opening the second seal, moving the slidable seal and screen downwardly, sealing the well above the last section of screen, lowering the screen to the bottom of the well, opening the imperforate sections between the sections of screen to permit flow through said imperforate sections, and opening the well to flow the same.

2. In a method of running screen into a well having casing therein closed adjacent its upper end and containing high formation pressure not compensated for, the steps of making up the screen with closed imperforate sections interposed therein at intervals, forming slidable seals successively between said imperforate sections and the casing, moving said screen downwardly through each of said slidable seals, sealing the well above the last section of screen, lowering the screen to the bottom of the well, opening the imperforate sections between the sections of screen to permit flow through said imperforate sections and opening the well to flow the same.

3. In a method of running screen and tubing into a well having casing therein closed adjacent its upper end, and containing high formation pressure not compensated for, the steps of making up the screen with closed imperforate sections interposed therein at intervals, forming successive sliding seals between said imperforate sections and the casing, moving said screen downwardly through said slidable seals, securing a closed tubing to the screen, forming a slidable seal between said tubing and the casing, moving the tubing and screen downwardly while maintaining the last mentioned slidable seal until the screen is opposite the producing formation, releasing the tubing from the screen, and opening the imperforate sections between the sections of screen to permit flow through said imperforate sections, forming a seal between the upper end of the screen and the casing, hanging the tubing, and opening the tubing to flow the well.

4. In a method of running screen and tubing into a well having casing therein closed adjacent its upper end, and containing high formation pressure not compensated for, the steps of making up the screen with closed imperforate sections interposed therein at intervals, forming successive sliding seals between said imperforate sections and the casing, moving said screen downwardly through said slidable seals, securing a closed tubing to the lower end of the screen, forming a slidable seal between said tubing and the casing, moving the tubing and screen downwardly while maintaining the last mentioned slidable seal until the screen is opposite the producing formation, releasing the tubing from the screen, drawing the tubing upwardly and opening the imperforate sections between the sections of screen to permit flow through said imperforate sections, forming a seal between the upper end of the screen and the casing, hanging the tubing, and opening the tubing to flow the well.

5. In a method of setting tubing in a well having casing therein and closed adjacent its upper end and containing high formation pressure not compensated for, the steps of forming a seal between a tubing and the upper end of said casing preventing upward flow through said tubing, opening the casing, lowering the tubing into the well while maintaining said seal and continuing to prevent upward flow through the tubing, hanging the tubing, connecting flow lines to the tubing, and permitting upward flow through the tubing from the well formation.

6. In an apparatus for running screen into a well against formation pressure not compensated for, a casing, a casing head on said casing having flow lines leading therefrom, a master valve above said casing head, a blow-out preventer above said master valve of a size to receive the screen pipe, a length of pipe of substantially the size of said casing above said blow-out preventer, a second blow-out preventer of the same size above said first blow-out preventer, and a handling nipple of the same external diameter as said screen pipe adapted to be connected to successive sections of said screen pipe to lower the same into the well through said blow-out preventers.

7. In an apparatus for running screen and tubing into a well against formation pressure not compensated for, a casing, a means for closing said casing, a blow-out preventer above said means of a size to receive the tubing, a second blow-out preventer of a size to receive the screen pipe, a length of pipe above said last blow-out preventer, a second length of pipe adapted to telescope with said first length of pipe, means forming a sliding seal between said lengths of pipe, and means on said second length of pipe for connection with a section of pipe the size of the screen pipe.

8. In a screen pipe assembly adapted to be run into a well under pressure, a plurality of sections of screen pipe, a set shoe on the lower end of the lower section of said screen pipe, sections of blank pipe interposed between said sections of screen pipe, a closed tubing extending downwardly through said screen pipe and said sections of blank pipe, and secured at the lower end of said tubing to said set shoe, and means for sealing off the annular space between said tubing and each of said sections of blank pipe.

9. In a screen pipe assembly adapted to be run into a well under pressure, a plurality of sections of screen pipe, sections of blank pipe interposed between said sections of screen pipe, and means for temporarily sealing the sections of screen while being run into the well.

10. In a set shoe for the lower end of a well screen, a body having an opening therethrough, means on said body for connecting a screen pipe thereto, means within said body forming a seat for the lower end of a string of tubing, threaded means slidably and non-rotatably mounted in said body adapted to threadedly engage such string of tubing, and means for limiting the sliding movement of said threaded means.

JAMES H. HOWARD.